United States Patent [19]

Archer

[11] 4,414,797
[45] Nov. 15, 1983

[54] GARDENING TOOL

[76] Inventor: Gene R. Archer, 8225 Gale Rd., Rte. 1, Hebron, Ohio 43025

[21] Appl. No.: 327,556

[22] Filed: Dec. 4, 1981

[51] Int. Cl.³ .............................................. A01D 7/06
[52] U.S. Cl. ................... 56/400.19; 56/340; 56/400.01
[58] Field of Search .......... 56/400.16, 400.19, 400.21, 56/400.2, 400.11, 400.01, 340

[56] References Cited

U.S. PATENT DOCUMENTS

| | | | |
|---|---|---|---|
| 31,152 | 7/1899 | Rock | 56/339 |
| 241,948 | 5/1881 | Ferris | 56/340 |
| 245,279 | 8/1881 | Collins | 56/400.21 |
| 395,721 | 1/1889 | Steiner | 56/400.21 |
| 452,704 | 5/1891 | Harris | 56/340 |
| 1,070,868 | 8/1913 | Worthington | 56/400.21 |
| 1,100,323 | 6/1914 | Ovens | 56/400.21 |
| 1,225,097 | 5/1917 | Young | 56/339 |
| 2,164,233 | 6/1939 | Dubbs | 56/400.21 |
| 3,234,720 | 2/1966 | Blodgett | 56/400.19 |
| 3,927,721 | 12/1975 | Coppock | 56/400.2 |
| 4,289,344 | 9/1981 | Mitchell | 56/400.19 |

FOREIGN PATENT DOCUMENTS 12643   4/1881   Canada ................................. 56/340

*Primary Examiner*—Paul J. Hirsch
*Attorney, Agent, or Firm*—Robert B. Watkins

[57] ABSTRACT

A garden tool having a handle connected to a comb element which is provided with a sinuous serpentine plurality of projecting lobes constructed from a single continuous member of elastic material with the working section supported by and attached to the handle only at the ends of the element, the comb element being characterized by elastic and resilient response when applied to the earth in gardening activities.

9 Claims, 12 Drawing Figures

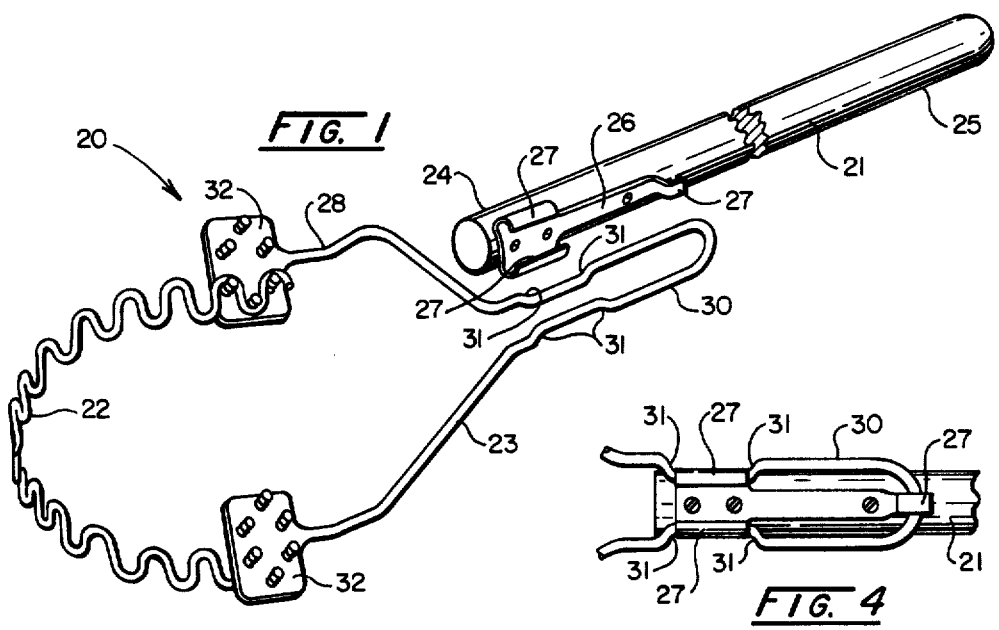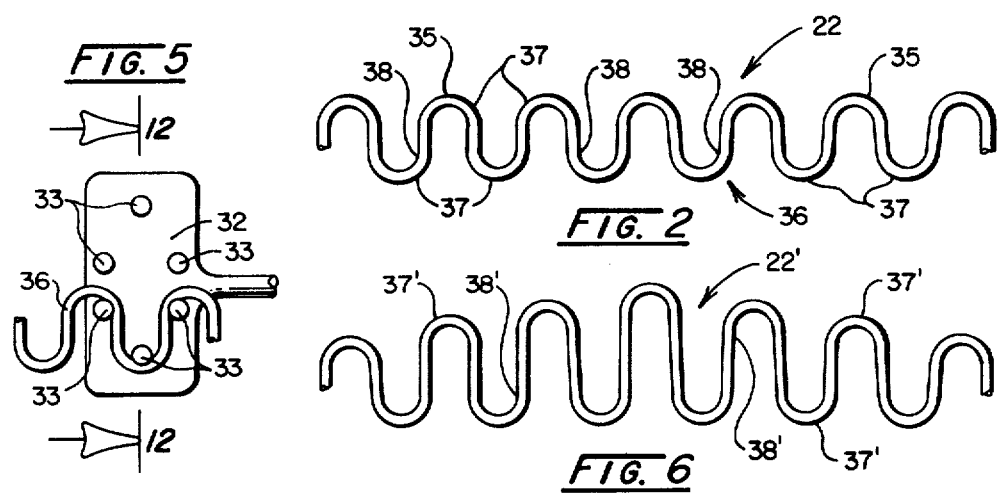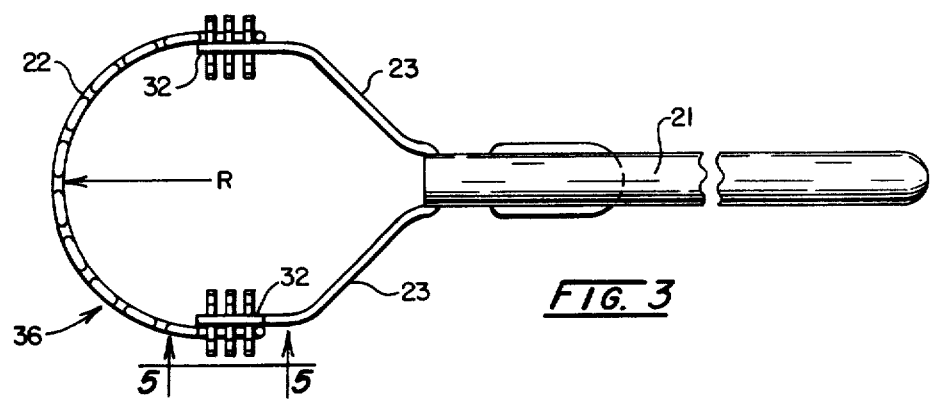

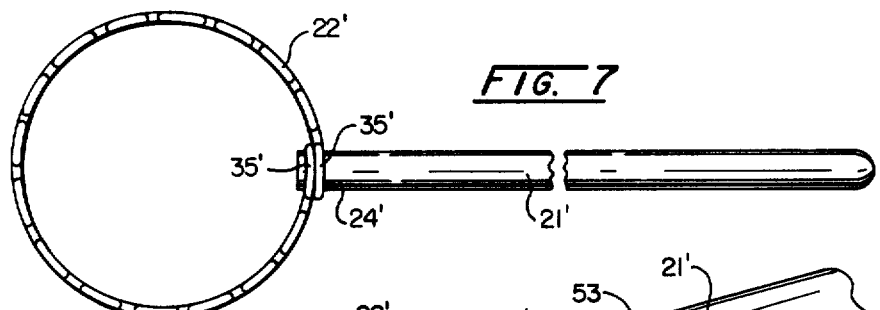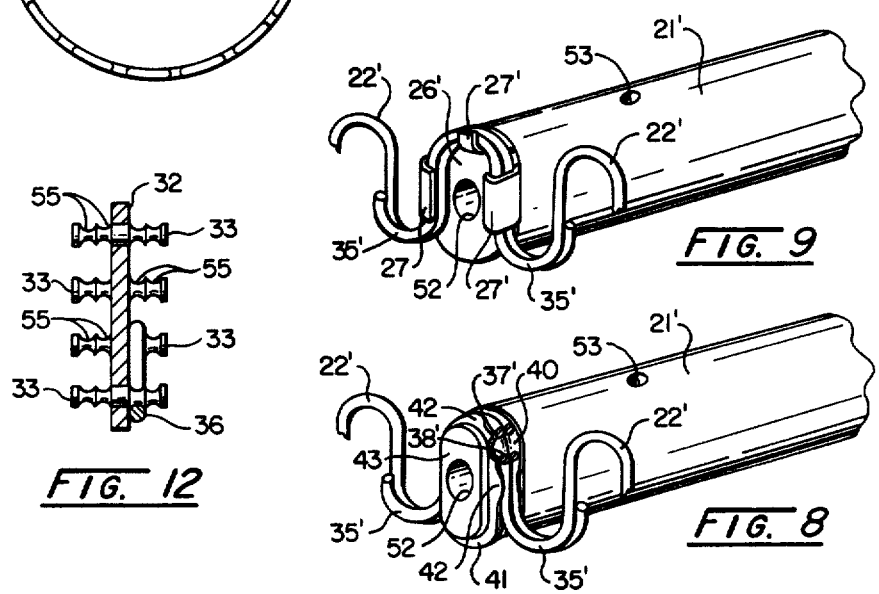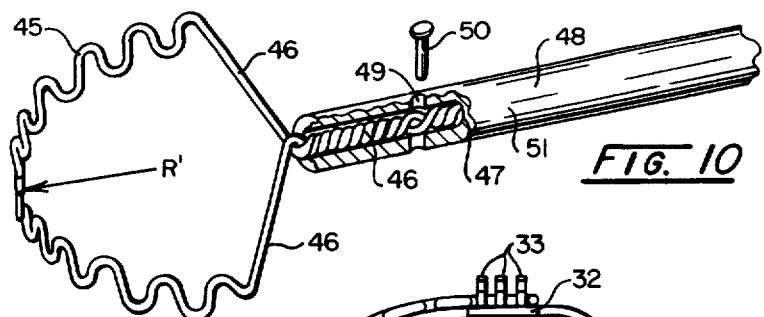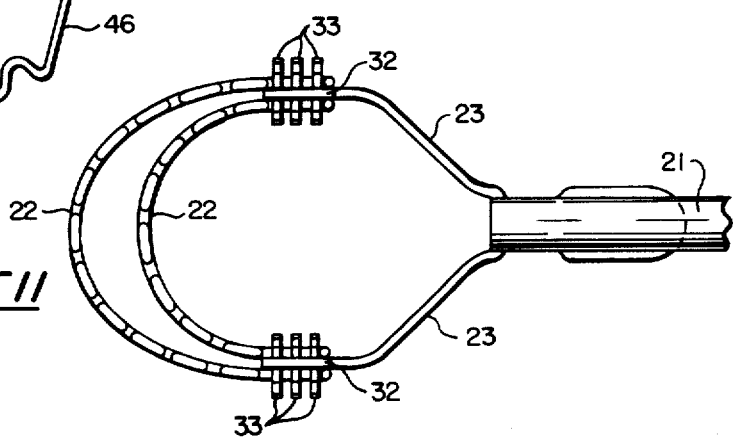

GARDENING TOOL

SUMMARY OF THE INVENTION

This invention relates to a gardening tool and more particularly to that type of gardening tool which is most similar to a rake.

Briefly and in summary, the invention is a gardening tool having a handle which is attached to a comb element having a working section that is formed of a sinuous serpentine plurality of projecting lobes constructed from a single continuous member, with the working section supported by and attached to the handle only at the ends of the member. The working section of this invention is characterized by an elastic response when applied to the earth in gardening activities.

Gardening tools have had many shapes and forms in the past and those of the rake variety fit this characterization quite readily. This invention includes improvements in those kinds of rakes which are aimed at moving fragments of the earth such as lumps and rocks as well as foliage and leaves upon the surface. While the improvements of this invention provide some benefit to the activities of digging, they are aimed primarily at increasing the usefulness of a tool in the former stated operations.

While others have worked and provided supposedly improved constructions for rakes, they have not conceived the advantages that are found in this invention. U.S. Pat. Nos. 220,511, 676,525 and 1,601,745 as well as U.S. Pat. Nos. 245,229, 395,721 and 1,100,323 are typical of the prior art in the background of this invention. The latter three patents show rakes which are made from a single developed form of single strand of material. These patents, however, are devices which lack the elastic resilient nature that is found to be an advantage and is present in the improvements of this invention. Each of these patented constructions includes a provision for holding the working element at the center and fastening it to the handle from that point.

The improvements of this invention have as an object to provide a working element which is flexible and elastic and which is supported in such a manner; i.e., only at the ends, so that the elastic nature of the element is unconfined and allowed to work with the motions provided by the user at the handle.

It is a further object of this invention to provide a working element which is easily attached to a handle in a variety of ways to provide for a variety of uses as the situation demands and the user desires.

The foregoing and other advantages of the invention will become apparent from the following disclosure in which a preferred embodiment of the invention is described in detail and illustrated in the accompanying drawings. It is contemplated that variations in procedures, structural features and arrangement of parts will appear to the person skilled in the art, without departing from the scope or sacrificing any of the advantages of the invention.

DESCRIPTION OF THE DRAWINGS

FIG. 1 is an exploded perspective view of a preferred embodiment of this invention as viewed from a position at the front and below the normal operating position.

FIG. 2 is a planar development view of a comb element of this invention.

FIG. 3 is a top plan view of the embodiment of FIG. 1.

FIG. 4 is an enlarged bottom plan view of a portion of the handle and yoke of the invention.

FIG. 5 is an enlarged view of a portion of the yoke and comb element of the invention taken along the line 5—5 of FIG. 3.

FIG. 6 is a planar development view of another embodiment of a comb element of the invention.

FIG. 7 is a plan view of another embodiment of this invention showing a different means of attaching the comb element to the handle.

FIG. 8 is a perspective view of an attachment means for use in the embodiment of FIG. 7.

FIG. 9 is a perspective view showing another attachment means in place in the embodiment shown in FIG. 7.

FIG. 10 is a perspective view of another embodiment of the invention.

FIG. 11 is a plan view of the embodiment shown in FIG. 3 arranged in a different configuration and with an additional feature.

FIG. 12 is a cross-sectional view taken along the line 12—12 in FIG. 5.

DETAILED DESCRIPTION OF THE INVENTION

Referring to FIGS. 1 and 2, a gardening tool 20 comprises a handle 21 and a comb element 22. In a preferred embodiment, the handle 21 may be attached to the comb element 22 by a yoke member 23.

The handle 21 is elongated and cylindrical or other convenient shape formed to fit the hands of a worker and having an attachment end 24 and a grasping end 25. The attachment end 24 is provided with a clip member 26 which has stamped or formed retainer elements 27.

As seen in FIGS. 1 and 4, the yoke 23 is formed in a looped stem portion 30 which is provided with crimped detents 31. The looped stem portion 30 is fitted into and held in the clip 26 by elastic deformation of the stem to fit over and beneath the retainer elements 27. The detents 31 prevent the yoke member 23 and stem 30 from moving laterally in the retainer 27.

The yoke 23 is formed divergently from the stem portion 30 to an anchor plate 32 at the opposite ends. Each anchor plate 32 is provided with plurality of welded or cast projecting pins 33.

A bend 28 is provided in the arms of the yoke 23 to establish a convenient attitude between the axis of the handle 21 and the working plane of the comb element 22. This causes the comb element to touch the ground in a relatively flat position when the handle 21 is grasped at the end 25 by a person in a standing working position.

Referring to FIG. 2, the comb element 22 in its flat development plan comprises attachment end portions 35 and a centrally positioned working section 36 therebetween. The comb element 22 is constructed from a single continuous strand or member of elastic material and is formed in a sinuous serpentine plurality of projecting lobes 37. Between each lobe 37 is a sinus 38. In the embodiment shown in FIG. 2 comb element 22 is symmetrical in shape and all of the lobes 37 and sinuses 38 are the same size and shape.

The comb element 22 is constructed of a relatively hard elastic spring-like material such as hardened steel. The elasticity and resiliency of the comb element is a very important attribute of its performance and use.

By means of this elasticity and resilience, the attachment end portions 35 are caused to snap over and "engage" the pins 33 in a manner to grasp them and hold the comb element in place, as seen in FIGS. 3 and 5. The elasticity of the comb element 22 also allows for forming the working section 36 to take the bowed shape with the radius R. In the normal at rest position (not shown), the comb element 22 is formed to almost a circle in plan view, such as FIG. 3. In this rest position, the radius of curvatures is less than R.

In the assembled configuraiton as shown in FIG. 3, the gardening tool 20 may be used by grasping the handle and stroking the comb element 22 on the ground dragging it through loose elements of earth, twigs, leaves and other matter. In the stroking action, the elastic response of the comb element 22 and the yoke 33 allows a large degree of resilient deformation to take place making it possible to maintain the comb element in contact with the earth along its entire length even if the earth or working surface has troughs, hills or valleys. In addition, the resiliency combined with the shape and construction of the gardening tool 20 makes it possible, through manual dexterity on the part of the user, to apply only that amount of pressure necessary to accomplish the task at hand.

Because of construction features of the garden tool of this invention, a large degree of versatility is provided in the assembly and use of the tool. For instance, in the embodiment of the comb element 22 shown in FIG. 2, having a completely symmetrical sinuous serpentine shape, the comb element 22 may be attached to the pins 33 at various positions along its length rather than at the end as shown in FIG. 5. This makes it possible to vary the radius R as convenient for the type of work upon which the garden tool 20 is being used.

Referring again to FIG. 1, it will be seen that the stem portion 30 of the yoke 23 has the general configuration of an auxiliary handle. Therefore, when convenient or necessary, the yoke 23 may be detached from the clip 26 in the handle 21 and the tool 20 may be used in a short-handled one-hand operation to break clumps of earth and move materials while working in a kneeling position.

Referring to FIG. 6, another form of comb element 22' is disclosed wherein the size or height of the lobes and sinuses are varied and made larger toward the center of the distance between the ends. This configuration might be useful for activity in the bottom of a furrow or ditch.

Other configurations will be within the vision of those skilled in the art, such as alternating large and small lobes, etc.

Further versatility is available by attachment of two or more comb elements as shown in FIG. 11. Other comb elements can be added above those shown on the lower pins 33. In a similar manner, comb elements may be added in various over and under combinations as the work situation calls for.

Referring to FIG. 7, in another embodiment of the invention the comb element 22' may be assembled to the end of the handle 21' directly without the use of a yoke. This is accomplished by elastically deforming the comb element 22' into a closed circle and bringing the attachment ends 35' into overlapping position at the attachment end 24' of the handle 21'.

In this embodiment, the ends 35' of the comb element 22' are overlapped, as shown in FIG. 9, and deformed into position beneath the retainers 27' of a clip 26' of the handle 21'.

As an alternative to this embodiment, the handle 21' may have end clip 26' and a side clip 26 as shown in FIG. 1, so that the user has the alternative of assembling the garden tool in the embodiment shown in FIG. 1 or the embodiment shown in FIGS. 7 and 9.

In still another embodiment of the invention, as shown in FIG. 8, comb element 22' may be fastened to the end of the handle 21' by overlapping the ends 35' and clamping the sinuses 38' around a grooved grommet 41 which is annularly fastened on an end portion 43 of reduced size. The grommet 41, is constructed with grooves 40 in which the sinuses 38' fit. At necessary places along the edges of the grommet 41, retainers 42 are crimped in position to retain the sinuses 38' in place.

Still another embodiment of the invention is shown in FIG. 10, in which a comb element 45, having the properties of the comb element of FIG. 1, is formed in a circle R' and twisted together at the ends 46. Twisted ends 46 are positioned in a bore 47 in a handle 48. A cross-bore 49 is provided through which a pin 50 is inserted that passes through a formed opening in the twisted ends 46. The pin 50 may be removable and the comb element 45 detached, so that a comb element 22 and yoke 23 may be assembled to a clip 26 that is also provided on a side 51 of the handle 48.

Referring again to FIGS. 8 and 9, a central bore 52 and counterbore 53 may be included in the end of handles having clips 26' or grommets 41. The bores 52 and counterbores 53 could be used for a comb element embodiment such as shown in FIG. 10.

Referring to FIGS. 5 and 12, the plate 32 includes the pins 33 held in position by welding or other means. The pins 33 are grouped to conveniently grip the ends of the combs 22. Each pin 33 has a plurality of grooves 55 constructed to receive the curvature of the comb material. The grooves 55 prevent the combs from twisting and sliding off the ends of the pins 33.

In all the embodiments of the invention described above, it is an important feature that the comb elements are attached only at their ends so that the total elastic deformation provided by the sinuous serpentine shape and the elastic properties of the material is available for the manipulation of the user. A supporting attachment at the center or between the ends would provide a decrease in elasticity and an increase in rigidity. This would tend to defeat an object of this invention which is met in the overall construction herein provided.

As an additional option, the clip 26 could be used to attach tools other than the comb elements of this invention.

It is herein understood that although the present invention has been specifically disclosed with the preferred embodiments and examples, modification and variations of the concepts herein disclosed, may be resorted to by those skilled in the art. Such modifications and variations are considered to be within the scope of the invention and the appended claims.

What is claimed is:

1. A gardening tool comprising:
   a. a handle;
   b. a comb element including attachemnt end sections on opposite sides of a working section of a sinuous serpentine plurality of projecting lobes constructed from a continuous member of elastic material, with the comb element supported by and attached to the handle only at the attachment end sections of the comb element, wherein the working section is characterized by having an elastic response when applied to the work in gardening activities; and c. a yoke between the ends of the comb element and the handle, the yoke being constructed at one end with projecting lateral pins for engagement with projecting lobes of the attachment ends of the comb element and to attach to an end of the handle at the other end.

2. A gardening tool, according to claim 1, wherein the handle is elongate in shape and formed to fit the hands of a worker.

3. A gardening tool, according to claim 1, where the single continuous member is constructed of hardened elastic metal.

4. A gardening tool, according to claim 1, wherein the ends of the comb element are overlapped and held on the end of the handle by at least one retainer.

5. A gardening tool, according to claim 4, wherein the at least one retainer is on a grommet encircling the end of the handle.

6. A gardening tool, according to claim 4, wherein the overlapping ends of the comb element are retained by a plurality of retainers on a clip which is fastened to the end of the handle.

7. A gardening tool comprising:
a. a handle;
b. a comb element including attachment end sections on opposite sides of a working section of a sinuous serpentine plurality of projecting lobes constructed from a continuous member of elastic material, with the comb element supported by and attached to the handle only at the attachment end sections of the comb element, wherein the working section is characterized by having an elastic response when applied to the work in gardening activities;
c. a yoke between the ends of the comb element and the handle, the yoke being constructed at one end with projecting lateral pins for engagement with projecting lobes for the attachment ends of the comb element and to attach to an end of the handle at the other end; and
d. wherein the handle is provided with a plurality of retainers, and the yoke is formed to fit beneath and be retained by the retainers on the handle, the elasticity of the yoke serving to press the yoke beneath the retainers in retained position.

8. A gardening tool, according to claim 7, wherein the retainers are provided on the side of the handle.

9. A gardening tool, according to claim 7, wherein an additional plurality of second retainers are provided on the end of the handle for the alternative attachment of the comb element directly to the handle by attaching a lobe at each end of the working section to the retainers on the end of the handle when the yoke is removed.

* * * * *